Patented Aug. 27, 1940

2,213,156

UNITED STATES PATENT OFFICE 2,213,156

INSECT REPELLENT

Philip Granett, New Brunswick, N. J., assignor to National Carbon Company, Inc., a corporation of New York No Drawing. Application June 4, 1938,
Serial No. 211,820

12 Claims. (Cl. 167—22)

Preparations capable of repelling mosquitoes, flies, gnats, fleas and other insect pests are genuinely valuable in the promotion of health and comfort. This invention is concerned with insect repellents, and its primary object is to provide compositions of improved effectiveness in repelling various insect pests, particularly mosquitoes.

I have found by test that insect repellent compositions of unusual efficacy can be made by employing as their essential ingredients, certain mono- or di-alkyl, aryl or aralkyl ethers of ethylene and diethylene glycols, or similar monoethers of the monoacetates of these glycols. It is preferred to select a substance of this class which is relatively non-volatile, or which has a boiling point above about 175° C., and those substances which have but slight odor, or which possess not unpleasant odors are most desirable.

In general, this class of compounds may be designated by the formula $R_1$—O—$(C_2H_4)_x$—$R_2$ wherein $R_1$ may be an alkyl, aryl or aralkyl group, $R_2$ may be hydrogen, an alkyl, aryl, aralkyl or acetyl group, and $n$ is one or two. Specific compounds of this class which are useful in making the improved insect repellents are: diethylene glycol monobutyl ether, diethylene glycol monoethyl ether, ethylene glycol monobenzyl ether, ethylene glycol monophenyl ether, diethylene glycol monobenzyl ether, diethylene glycol monophenyl ether, ethylene glycol monoeugenyl ether (1-allyl 3-methoxy 4 hydroxy-ethoxy benzene), diethylene glycol diethyl ether, ethylene glycol dibenzyl ether, diethylene glycol butyl benzyl ether, and the acetates of any of the monoethers named above. Examples of such acetates are diethylene glycol monoethyl ether acetate, diethylene glycol monobutyl ether acetate and the acetate of ethylene glycol monophenyl ether.

The advantages realized by employing the above compounds as repellents include the provision of effective repellency against such insects as mosquitoes, house flies, stable flies, black flies and fleas with a minimum of discomfort to the user. The substances named are all relatively non-volatile liquids, and are therefore lasting repellents. Unlike many other repellents, notably essential oils such as citronella, these materials are almost odorless, and, if desired, suitable perfumes may be incorporated. Preparations containing these materials may be placed directly in contact with the skin or clothing since they have, in general, substantially no irritating effect upon the skin or deleterious action on fabrics. On sensitive skin, some of these compounds may cause a momentary smarting sensation, particularly if applied full strength. Also, artificial fiber may be softened, and some textile dyes dissolved, by excessive quantities of certain of these compounds, due to their solvent nature, unless they are diluted or incorporated with inert materials. Similarly, these compounds may have a cleansing effect on the skin, and they may tend to soften or dissolve paints and cosmetics with which the repellent comes in contact. These compounds are not greasy or oily in nature and they may be easily washed off.

As a rule, it is desirable to incorporate small amounts of certain inert materials, such as vegetable or mineral oils, particularly corn oil, with the repellent because on a dry type of skin these repellents sometimes tend to form a dry white layer two or three hours after application. While this is in no way harmful, it is undesirable from the viewpoint of appearance.

Besides tests on mosquitoes, various tests have been made with these repellents against other insects. For example, in tests made in the Adirondacks, black flies (Simulidae spp.) were repelled from skin areas treated with a mixture containing 50% by volume diethylene glycol monobutyl ether acetate, 15% diethylene glycol monoethyl ether, 7% corn oil and 28% ethanol for periods ranging from one to two hours. These flies tend to crawl beneath clothing and then inflict their painful bites. This can be prevented to a large extent by placing the repellent around openings, such as those of the sleeves and collar.

The above mixture applied to arms and legs has prevented fleas from alighting and biting these parts when the user remained in a space heavily infested with these insects. Previous to treatment at least ten to fifteen fleas could be seen crawling about on the legs at any one time. During the test, fleas were continually present, several being visible on the untreated leg whenever it was examined. Protection against the fleas lasted for several hours.

Other biting flies, such as stable flies (Stomoxys calcitrans) and strawberry or deer flies (Chrysop spp.) have been repelled, but against such flies the period of repellency is generally shorter than against mosquitoes. Protection of from one-half to one-hour has been obtained against these species.

The above mixture has also been tried for the protection of animals against insect pests. On dogs it has been effective in repelling fleas for 24 to 48 hours. On cattle, this mixture, containing an additional 5% of diethylene glycol monobutyl ether acetate, incorporated in petroleum oil, has been found to repel house flies (*Musca domestica*) and small biting flies (*Muscina*) for a period of about 4 hours.

The compounds described are, on an average, from two to five times as effective repellents as oil of citronella, or from ten to fifteen times as effective as pine oil and the like. Some of the more preferred compounds, such as diethylene glycol butyl benzyl ether, ethylene glycol monobenzyl ether, ethylene glycol dibenzyl ether and diethylene glycol monobutyl ether acetate, have effective repellencies ranging from five to more than twelve times that of citronella.

These compounds need not be applied full strength to the body, but may be diluted with inert materials or mixed with one another, or both. In general, dilution with inert materials reduces the effective repellency of the compound, but in some cases moderate dilution actually renders the compound far more repellent than in the pure state. For example, the repellency of a mixture of equal parts of ethylene glycol monobenzyl ether and ethanol has only about one-third the repellency of the pure monobenzyl ether, but a mixture of equal parts of ethanol and diethylene glycol monophenyl ether has a repellency of several times that of the pure monophenyl ether. Further dilution, however, causes a very marked decrease in repellency.

Although the better repellents are relatively non-volatile (boiling points usually being above about 175° C.) some degree of volatility is necessary to keep the insects—particularly mosquitoes—away from treated parts. Furthermore, odors perceptible to man do not, in themselves, seem to influence mosquitoes to any marked extent. For instance, the odor of citronella will persist long after its repellency has disappeared. Intensity of odor does not seem to affect the insects either, for certain of the butyl compounds have very strong odors yet are not good repellents.

The compounds described may be applied, as such, to surfaces from which it is desired to repel the insect pests. They may also be applied as ingredients of lotions compounded with volatile diluents, such as ethanol, or less volatile materials, such as glycerol. The repellents may be applied in combination with various oily carriers, including vegetable oils, such as castor oil and peanut oil, and certain mineral oils. Unguents or creams containing the repellents, as well as powders or carriers of like nature may be effectively used. In any of the different modes of application, it will be understood that mixtures or blends of the individual repellents may be employed.

My invention is not limited to the specific substances named, and it includes modifications within its scope as defined by the appended claims.

This application contains subject matter in common with my copending application Serial No. 68,191 filed March 11, 1936.

I claim:

1. An insect repellent composition which consists of an inert diluent and a repellent; said repellent consisting of at least one compound having the formula $R_1—O—(C_2H_4O)_n—R_2$, wherein $R_1$ may be a lower alkyl group, monocyclic aryl group, or aralkyl hydrocarbon group, $R_2$ may be hydrogen, a lower alkyl group, monocyclic aryl group, aralkyl hydrocarbon group or acetyl group, and $n$ is 1 or 2.

2. An insect repellent composition which consists of an inert diluent and a repellent; said diluent containing an oil, and said repellent consisting of at least one compound having the formula $R_1—O—(C_2H_4O)_n—R_2$, wherein $R_1$ may be a lower alkyl group, monocyclic aryl group, or aralkyl hydrocarbon group, $R_2$ may be hydrogen, a lower alkyl group, monocyclic aryl group, aralkyl hydrocarbon group or acetyl group, and $n$ is 1 or 2.

3. An insect repellent composition which consists of an inert diluent and a repellent; said diluent containing a vegetable oil, and said repellent consisting of at least one compound having the formula $R_1—O—(C_2H_4O)_n—R_2$, wherein $R_1$ may be a lower alkyl group, monocyclic aryl group, or aralkyl hydrocarbon group, $R_2$ may be hydrogen, a lower alkyl group, monocyclic aryl group, aralkyl hydrocarbon group or acetyl group, and $n$ is 1 or 2.

4. An insect repellent composition which contains as the essential repellent ingredient diethylene glycol monobutyl ether acetate.

5. An insect repellent composition which is comprised of an inert diluent and diethylene glycol monobutyl ether acetate as the essential ingredient.

6. An insect repellent composition which is comprised of an inert diluent and a repellent containing diethylene glycol monobutyl ether acetate, said diluent containing a vegetable oil.

7. An insect repellent composition which is comprised of an inert diluent and a repellent containing diethylene glycol monobutyl ether acetate, said diluent containing corn oil.

8. An insect repellent composition which is comprised of corn oil, alcohol and a repellent consisting of at least one compound having the formula $R_1—O—(C_2H_4O)_n—R_2$, wherein $R_1$ may be a lower alkyl group, monocyclic aryl group, or aralkyl hydrocarbon group, $R_2$ may be hydrogen, a lower alkyl group, monocyclic aryl group, aralkyl hydrocarbon group or acetyl group, and $n$ is 1 or 2.

9. An insect repellent composition which is comprised of corn oil, alcohol and a repellent containing diethylene glycol monobutyl ether acetate.

10. An insect repellent composition which contains as an essential repellent ingredient ethylene glycol monobenzyl ether.

11. An insect repellent composition which contains as an essential repellent ingredient ethylene glycol monophenyl ether acetate.

12. An insect repellent composition which is comprised of corn oil, alcohol, diethylene glycol monoethyl ether and diethylene glycol monobutyl ether acetate.

PHILIP GRANETT.

CERTIFICATE OF CORRECTION.

Patent No. 2,213,156. August 27, 1940.

PHILIP GRANETT.

It is hereby certified that error appears in the printed specification of the above numbered patent requiring correction as follows: Page 1, first column, line 20, for "$R_1-O-(C_2H_4)_n-R_2$" read --$R_1-O-(C_2H_4O)_n-R_2$--; and that the said Letters Patent should be read with this correction therein that the same may conform to the record of the case in the Patent Office.

Signed and sealed this 1st day of October, A. D. 1940.

Henry Van Arsdale,
Acting Commissioner of Patents.

(Seal)